(12) United States Patent
Bauer

(10) Patent No.: US 7,519,544 B1
(45) Date of Patent: Apr. 14, 2009

(54) MATERIAL BROWSER

(75) Inventor: Mitchell R. Bauer, Viroqua, WI (US)

(73) Assignee: NCR Corporation, Dayton, OH (US)

( * ) Notice: Subject to any disclaimer, the term of this patent is extended or adjusted under 35 U.S.C. 154(b) by 859 days.

(21) Appl. No.: 09/556,647

(22) Filed: Apr. 24, 2000

(51) Int. Cl.
G06F 17/60 (2006.01)

(52) U.S. Cl. ............................. 705/26; 705/27; 705/28

(58) Field of Classification Search .................. 705/26, 705/27, 28
See application file for complete search history.

(56) References Cited

U.S. PATENT DOCUMENTS

| | | | | |
|---|---|---|---|---|
| 4,972,318 A * | 11/1990 | Brown et al. | ................. | 705/26 |
| 5,625,776 A | 4/1997 | Johnson | | |
| 5,660,922 A * | 8/1997 | Herridge et al. | ............. | 428/214 |
| 5,771,172 A * | 6/1998 | Yamamoto et al. | .......... | 700/106 |
| 5,862,051 A * | 1/1999 | Barbur | ........................ | 700/106 |
| 5,914,878 A * | 6/1999 | Yamamoto et al. | .......... | 700/106 |
| 5,940,806 A * | 8/1999 | Danial | ........................ | 705/26 |
| 5,940,807 A * | 8/1999 | Purcell | ........................ | 705/26 |
| 6,052,672 A | 4/2000 | Foster | | |
| 6,078,906 A | 6/2000 | Huberman | | |
| 6,081,789 A * | 6/2000 | Purcell | ........................ | 705/37 |
| 6,324,522 B2 * | 11/2001 | Peterson et al. | ............... | 705/28 |
| 6,341,271 B1 * | 1/2002 | Salvo et al. | .................... | 705/28 |
| 6,366,829 B1 * | 4/2002 | Wallace | ....................... | 700/236 |
| 6,397,197 B1 | 5/2002 | Gindlesperger | | |
| 6,549,890 B2 * | 4/2003 | Mundell et al. | ............... | 705/10 |

FOREIGN PATENT DOCUMENTS

JP 2003093820 A * 4/2003

OTHER PUBLICATIONS

White, Ron, How Computers Work Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*
Co-pending U.S. Appl. No. 09/556,648, filed Apr. 24, 2000, by inventor Mitchell R. Bauer, entitled "Method of and Apparatus for Generating a Price Quote Request", assigned to NCR Corporation.

* cited by examiner

Primary Examiner—Pierre E Elisca
(74) Attorney, Agent, or Firm—Kenneth M. Berner; Francis L. Conte

(57) ABSTRACT

The material browser utilizes software interacting with the user using customer application criteria to determine the most appropriate raw material required for an application. The customer application criteria used to determine the best raw material type includes: print method, minimum application temperature for adhesive, service range of adhesive, facestock types, and adhesive type. The material browser provides raw material specific information including master width, areas of concern regarding the raw materials use, description of facestock, description of adhesive, description of liner, description of typical applications for which the raw material selected may be used.

25 Claims, 3 Drawing Sheets

MATERIAL BROWSER

RELATED APPLICATIONS

The present application is related to co-pending patent application entitled "METHOD OF AND APPARATUS FOR GENERATING A PRICE QUOTE REQUESTS," application Ser. No. 09/556,648 and assigned to the instant assignee and filed on even date herewith and is hereby incorporated by reference into this specification in its entirety.

FIELD OF INVENTION

The present invention provides a method of and apparatus for a user to select a raw material, using filters based on customer application criteria, from a variety of raw materials offered in a wide variety of facestock, adhesive, and liner combinations available from multiple vendors. More particularly, the present invention relates to the use of a material browser including filters based on customer application criteria for enabling the user to select an appropriate raw material from a variety of raw materials. Still more particularly, the present invention relates to the selection of a raw material from a variety of pressure sensitive raw materials.

BACKGROUND ART

Manufacturing plants use different types of raw materials for manufacturing documents for customers in accordance with the customer's intended application. Customers interact with salespeople to determine and select the raw materials to be used by the manufacturing plants to produce the customer's documents, such as forms, labels, label/form combinations and paper rolls. One component of the customer's forms and labels is the pressure sensitive raw material. Pressure sensitive raw materials are offered in a wide variety of facestock, adhesive, and liner combinations from multiple vendors. Selecting the correct raw material code, which cross references to a raw material vendor's raw material specifications, for a customer's application can be difficult, complicated, and time consuming. Many times, the customer spends a large amount of time and effort selecting a raw material code only to find out at the time of delivery that the selected raw material will not be acceptable for the intended application. This is very frustrating for the customer and is oftentimes costly to the salesperson and manufacturing plant in terms of goodwill and financial expense associated with the customer. Thus, there is a need in the art for a method of enabling a customer to quickly select the correct raw material code for a document such as a form or label to be manufactured.

In many instances, the customer does not know the particulars of each vendor's raw material and does not have the time necessary to gain the knowledge. If the customer desires to know the vendor's raw material specifications, a time consuming amount of research must be completed. Further, the best raw material for a particular application varies based on the print method, adhesive type selected, minimum application temperature for the adhesive selected, service range of the adhesive selected, and facestock type selected. It would be beneficial for all of these criteria to be available to be known by the customer prior to selection of a raw material.

Print methods include cut sheet lap joined, cut sheet laser, direct thermal, thermal transfer and impact. Adhesive type include permanent, cold temp and removable. Facestock type include paper, kimdura, 100# tag, 7 pt tag, 8 pt tag, matte litho, latex impregnated, gloss, matte chrome polyester, bright chrome polyester, clear polyester, white polyester, polyolefin and vinyl.

Additionally, the raw material codes used by the manufacturer can be complicated and difficult to remember causing the customer's order to be prone to errors. The salespeople efficiency is reduced by the errors resulting from incorrect selection of raw material type by customers and the resulting cost of returned merchandise which is unsuited for the desired application by the customer. Therefore, there is a need in the art for a mechanism of simplifying the entry of raw material codes.

Further, many times valuable technical resources and personal time is diverted from product improvements in order to provide technical assistance to the sales force. Therefore, there is a need in the art for a mechanism to reduce salespeople's use of technical resources and personnel.

SUMMARY OF THE INVENTION

Accordingly, an object of the present invention is to provide a new and improved method of and apparatus for selecting a raw material, using customer application filters, from a variety of raw materials using a material browser.

Another object of the present invention is to provide a method of and apparatus for enabling a customer to quickly select the correct raw material code for a document to be manufactured using the raw material corresponding to the raw material code selected.

Another object of the present invention is to provide a method of and apparatus for displaying raw material criteria, such as print method, adhesive type selected, minimum application temperature for the adhesive selected, service range of the adhesive selected, and facestock type selected, to customers for selecting a raw material type.

Another object of the present invention is to provide a method of and apparatus for enabling the reduction of errors in the entry of raw material codes.

Another object of the present invention is to provide a method of and apparatus for reducing salespeople's use of technical resources and personnel.

The material browser uses software interacting with the user to determine the most appropriate raw material required for an application. The criteria used to determine the best raw material is known as the customer application criteria and includes: print method, minimum application temperature for adhesive, service range of adhesive, facestock types, and adhesive type.

In accordance with a method aspect of the invention, a user is queried for user input including a customer application criteria selection and raw material type selection based upon applying a filter of customer application criteria to a list of raw material types. If the user input is a raw material selection, raw material information about the raw material selected is displayed to the user and if the user input is a customer application criteria selection, a list of raw material types for user selection filtered by said customer application criteria selection and the customer application criteria selection is displayed to the user.

Another aspect of the invention relates to a computer system comprising a processor and a memory coupled to the processor. The memory stores sequences of instructions which, when executed by the processor, cause the processor to query the user for a user input. The user input includes a customer application criteria selection and raw material type selection based upon applying a filter of customer application criteria to a list of raw material types. If the user input is a raw material selection, the computer system displays raw material information corresponding to the raw material selection and if the user input is a customer application criteria, the computer system displays a filtered list of raw material types for user selection filtered by said customer application criteria selection and the customer application criteria selection.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The present invention is used in conjunction with and as a part of a price quote request system, such as the one described in the application entitled "Method of and Apparatus for a Price Quote Request" and filed on even date herewith and hereby incorporated by reference in its entirety. The present invention may, however, be used separate from the price quote system and with different raw material types and customer application criteria.

The material browser or pressure sensitive material browser allows the user to filter raw material choices by customer application criteria such as: print method, adhesive type, a minimum application temperature for adhesive type, service range of adhesive type, and facestock type. The material browser allows the user to filter raw material choices based on one of the above criteria, a combination of the above criteria, all of the above criteria, or none of the above criteria. Optionally, the raw material choices are also listed according to per thousand square inches cost, from lowest to highest. Once the filter criteria for the raw material have been selected, the user is provided with a listing of raw materials that match the criteria. The number of raw materials matching the criteria may range from zero to multiple raw materials.

The material browser also displays a description section offering detailed descriptions of each raw material, referred to as raw material information, when the raw material is selected in the list. Information in this section includes such things as master width, areas of concern regarding the raw materials use, description of facestock, description of adhesive, and description of liner, and description of typical applications for which the raw material may be utilized.

The material browser enables increased salespeople productivity, increased quotation hit rates, decreased quotation turnaround time, and allows the use of engineering resources to their full potential for pressure sensitive material product line growth. Quotation hit rates refer to the percentage of orders received from quotations. For example, if 100 price quote requests are processed and 25 orders are received in a month, then the quotation hit rate would be 25%.

Figure 1:
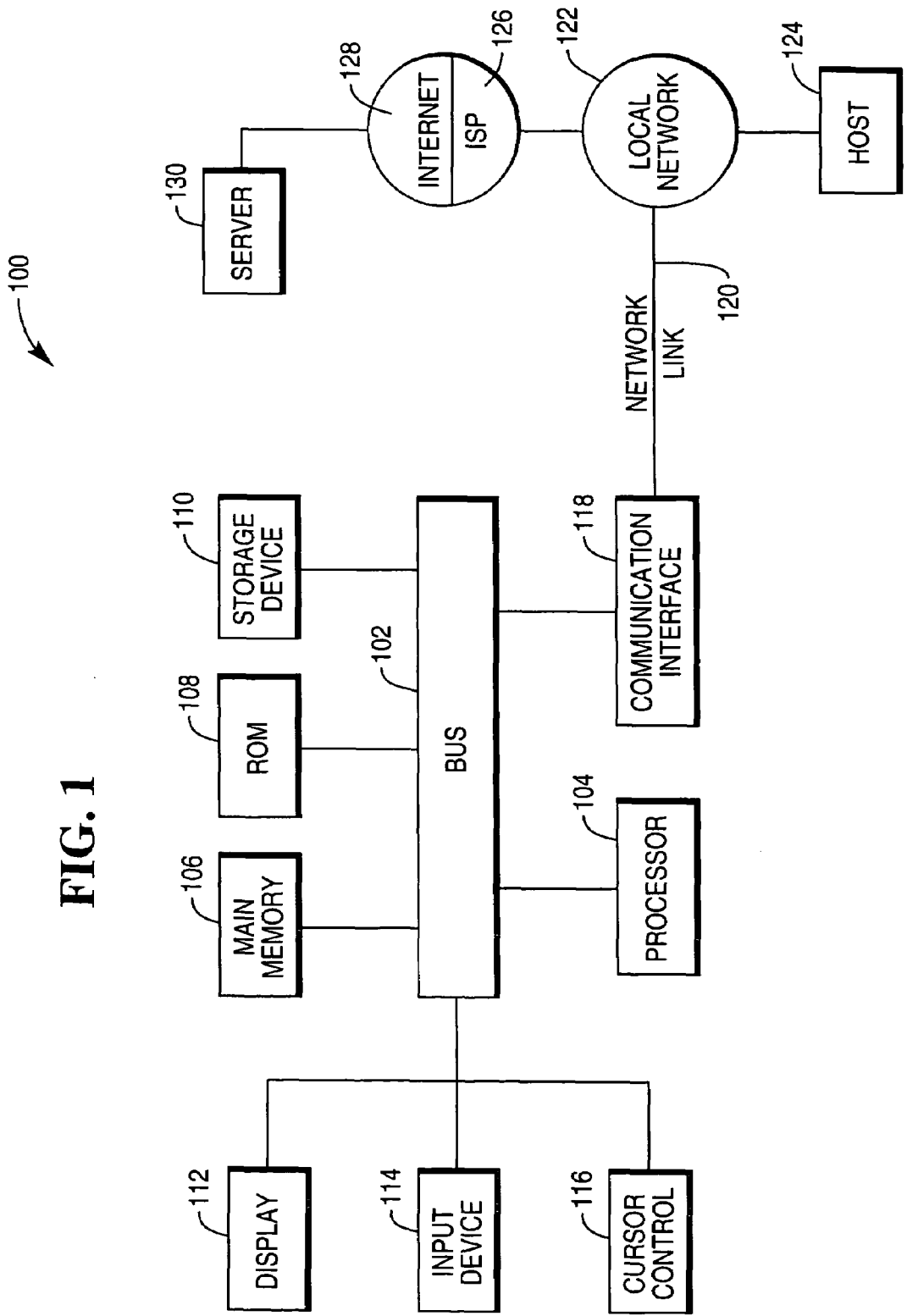
FIG. 1 is a high level block diagram of an exemplary computer system.

FIG. 1 is a high level block diagram illustrating an exemplary computer system upon which an embodiment of the invention may be implemented. The present invention is usable with currently available personal computers, laptop and notebook computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing instructions to be executed by processor 104. Main memory 106 also may be used for storing temporary variables, raw material types, customer application criteria, and raw material information or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing instructions, raw material types, customer application criteria, and raw material information.

Computer system 100 may be coupled via the bus 102 to a display 112, such as a cathode ray tube (CRT) or a flat panel display, for displaying information, such as the material browser window described in detail below, to the user. An input device 114, including alphanumeric and function keys, is coupled to the bus 102 for communicating information and command selections, such as user selection of raw material type and/or customer application criteria, to the processor 104 from the user. Another type of user input device is cursor control 116, such as a mouse, a trackball, or cursor direction keys for communicating direction information and command selections, such as those described in conjunction with the input device 114 to processor 104 and for controlling cursor movement on the display 112. This input device typically has two degrees of freedom in two axes, a first axis (e.g., x) and a second axis (e.g., y) allowing the device to specify positions in a plane.

Figure 2:
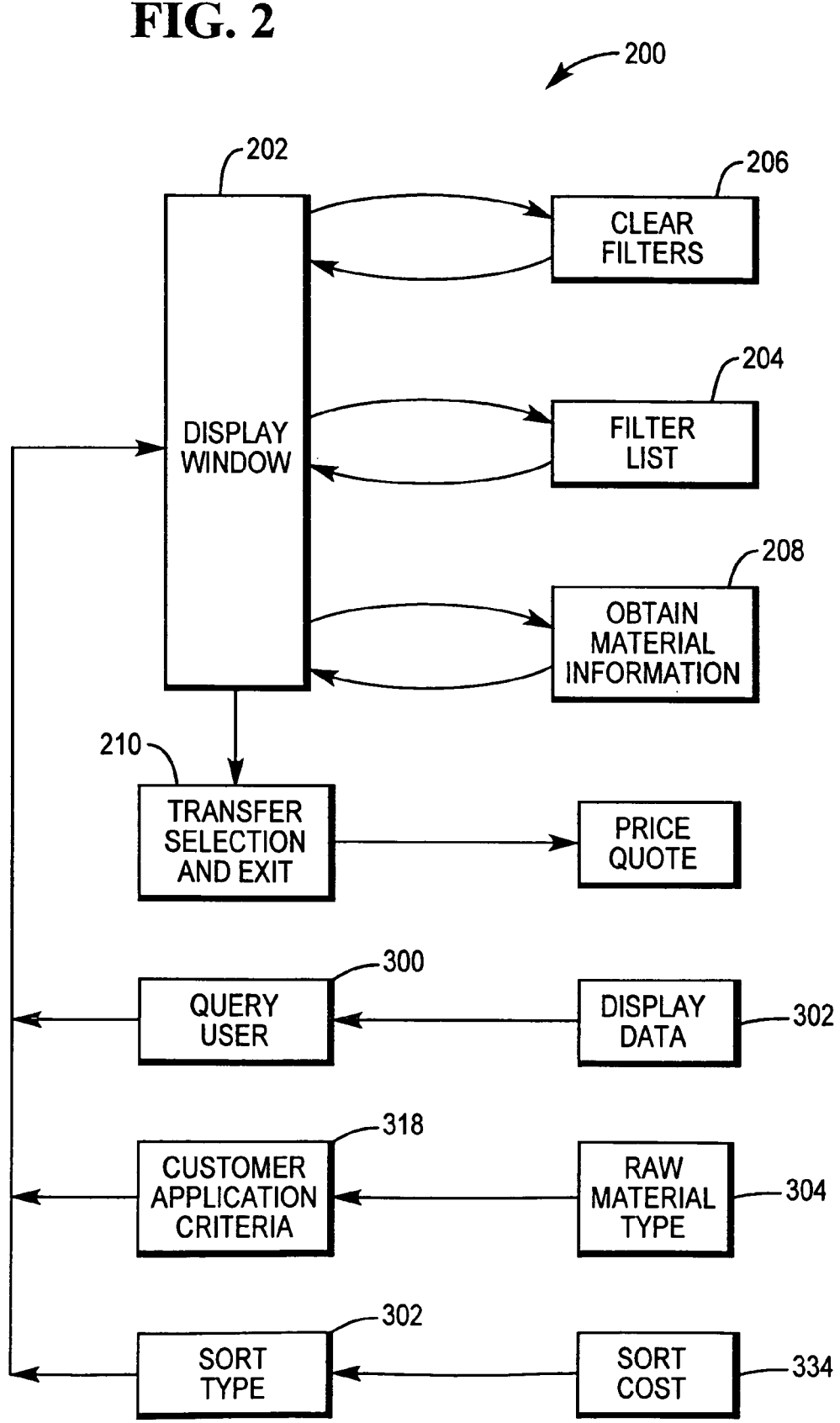
FIG. 2 is a high level flow chart according to the present invention.

The invention is related to the use of a computer system 100, such as the illustrated system of FIG. 2, to guide the user through the process of selecting a raw material using customer application criteria. According to one embodiment of the invention, a list of raw materials filtered by customer application criteria is provided by computer system 100 in response to processor 104 executing sequences of instructions contained in main memory 106. Such instructions may be read into main memory 106 from another computer-readable medium, such as storage device 110.

However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card, a digital subscriber line (DSL) card, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. Of particular note, the communications through interface 118 may permit transmission of the raw material types, customer application criteria and raw material information. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages including the raw material type, customer application information and raw material information and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for selecting a raw material by a user selecting customer application criteria. Additionally, the raw material type, customer application criteria, and raw material information may be modified by a host 124 or server 130 using network link 120.

The received code may be executed by processor 104 as it is received, and/or stored in storage device 110, or other non-volatile storage for later execution. In this manner, computer system 100 may obtain application code in the form of a carrier wave.

FIG. 2 is a high level flow chart of the flow of execution, generally indicated by reference character 200 in FIG. 2, of the instructions of the material browser. The control flow begins at step 202 wherein the material browser window, generally indicated by reference character 300 in FIG. 3 and described in detail below, is displayed to the user on display 112 of FIG. 1. When the user desires to narrow the list of raw material types displayed in the material browser, the flow proceeds to step 204. In step 204 and based on the user-selected customer application criteria, the material browser obtains a list of raw material types from a database (not shown) containing raw material type and associated raw material information and the flow returns to step 202 for display of the filtered list of raw material types in the material browser.

If the user has either narrowed the raw material type list too far, possibly resulting in zero raw material types displayed, or the user desires to start over with a different set of customer application criteria, the user clears the customer application criteria selections causing the flow to proceed to step 206. In step 206, the material browser resets the customer application criteria to nominal values and refreshes or obtains the list of raw material types from the database again and the flow returns to step 202 for display of the list of raw material types in the material browser.

In response to the user desiring to obtain further information about a specific raw material type, such as by selecting a raw material type in the material browser window, the flow of execution proceeds to step 208. In step 208, the material browser obtains the raw material information for a specific raw material type from the database and the flow returns to step 202 for display of the raw material information in the material browser as described in detail below.

When the user has selected the raw material type desired using the material browser and desires to exit the browser, the flow of execution proceeds to step 210. In step 210, the raw material code corresponding to the raw material type selected is transferred to the Price Quote Request Wizard as described in the above-referenced copending application.

Figure 3:
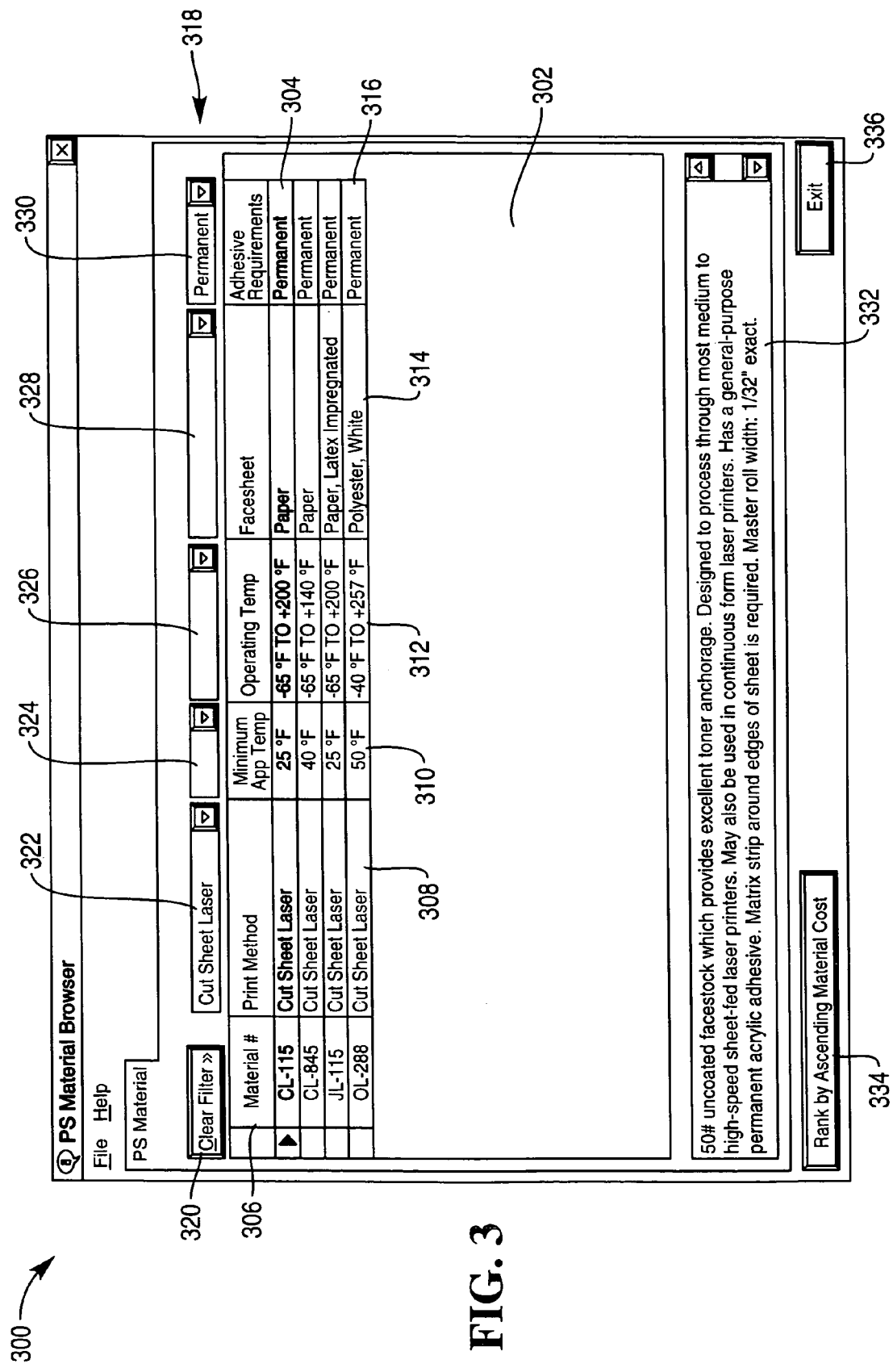
FIG. 3 is an illustration depicting an embodiment of a material browser.

Next, the material browser window displayed on display 112 is described. The user may use the material browser to specify the raw material type by way of selecting a raw material using the material browser window, generally indicated by reference character 300 as shown in FIG. 3. The material browser window 300 provides decision support for selecting the most appropriate raw material for the customer's application. Using filters or customer application criteria at the top of the material browser window 300, the user can quickly limit and identify the raw materials appropriate for the customer.

The material browser window 300 includes raw material list box 302 which displays line entries, such as a first line entry 304, corresponding to a specific raw material type. Accordingly, using first line entry 304 as an example, the raw material type corresponding to line entry 304 has raw material number of CL-115, indicated in a material number column 306, and is for a print method of cut sheet laser, indicated in a print method column 308. The raw material type of line entry 304 has a minimum application temperature of 25° Fahrenheit (F), indicated in a application temperature column 310, has a service range of −65° F. to +200° F., indicated in a operating temperature column 312, has a facestock of paper, indicated in a facesheet column 314, and is a permanent adhesive type, indicated in an adhesive type column 316. Additional raw material type entries are added to the raw material list box 302 as the filters or customer application criteria are modified; in the present example of FIG. 3, there are three other raw material type entries displayed in list box 302.

Above the list box 302 is a filter area, generally indicated by reference character 318, used by the user to narrow the entries displayed in list box 302. Filter area 318 includes a clear filter button 320, a print method drop-down list 322, a minimum application temperature drop-down list 324, an operating temperature drop-down list 326, a facesheet type drop-down list 328, and an adhesive requirement drop-down list 330. The material browser populates the drop-down filter lists 322 through 330 with entries obtained from a database containing information corresponding to the raw material types. In use, the user selects an entry in one or more of drop-down filter lists 322 through 330 or enters a value in one or more of the drop-down filter lists 322 through 330 to narrow the list of entries displayed in list box 302. If a user-defined filter using the drop-down filter lists is too narrow and returns no results in the list box 302, the user either selects the clear filter button 320 to clear the drop-down filter lists 322 through 330 or individually resets each of drop-down filter lists 322 through 330 to the nominal unfiltered value.

When the user has narrowed the list and/or located the desired entry, the user selects the entry in list box 302. In response to the user selecting a raw material type, the material browser locates the corresponding record in the raw material type database and obtains the raw material information corresponding to the raw material type selected. The raw material information is then displayed in raw material information text box 332 of the material browser window. The description section of text box 332 also includes the master width of the material to be purchased from the raw material vendor. This is an important consideration in working with the customer to design a label which keeps waste to a minimum. By default, the entries in raw material list box 302 are displayed in alphabetic order based on the material number column 306; however, a rank by cost button 334 may be selected by the user to view the list sorted by the unit cost of the raw material. When the user has selected the desired raw material type for the current order, the user then selects an exit button 336 to cause the transfer of the raw material code to the Price Quote Request Wizard as described above.

It should now be apparent that a method of and apparatus for selecting a raw material using a material browser and customer application criteria have been described. Accordingly, an advantage of the present invention is providing a new and improved method of and apparatus for selecting a raw material using a material browser and customer application criteria wherein the customer is enabled to quickly select the correct raw material code for a document to be manufactured.

Another advantage of the present invention is the provision of a method of and apparatus for displaying customer application criteria, such as print method, adhesive type selected, minimum application temperature for the adhesive selected, service range of the adhesive selected, and facestock type selected, to customers for selecting a raw material type. Additionally, the present invention provides a method of and apparatus for reducing errors in the entry of raw material codes.

Another advantage of the present invention is the freeing up of technical resources and personnel to work on product improvements instead of supporting the salespeople with technical assistance. Additionally, the user is able to sort material by cost, ensuring that the lowest cost material is recommended for a customer's application.

Although the present invention has been described with respect to specifying a raw material for a printed label, it should be understood that the principles of the present invention are equally applicable to any situation which requires a customer to select a raw material in which the customer needs to select from various engineering criteria.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein.

What is claimed is:

1. A computer implemented method of selecting a raw material for manufacturing a product therefrom comprising:

storing in a computer system a list of different raw materials, with each of said raw materials having various customer application criteria stored therewith, and said criteria being indicative of intended application of said raw material in a product;

populating a plurality of filter lists corresponding with said stored customer application criteria for said different raw materials;

displaying a material browser including a plurality of filters corresponding with said filter lists;

selecting one of said filter fists and specifying a filter criterion therein;

filtering said list of raw materials to obtain a filtered list thereof matching said filter criterion;

sorting said filtered list by unit cost of said raw materials; and displaying in said browser said filtered list of raw materials matching said filter criterion.

2. A method according to claim 1 further comprising displaying also in said browser said various customer application criteria corresponding with each of said raw materials in said filtered list.

3. A method according to claim 2 further comprising:

selecting a plurality of said filter lists and selecting corresponding filter criterion therefor; and filtering said list of raw materials to obtain said filtered list thereof matching said filter criteria corresponding with said selected filter lists.

4. A method according to claim 3 further comprising:

additionally storing with said list of raw materials raw material information corresponding with each of said raw materials including information different than said customer application criteria and information specific to permitted applications of said raw material in a product;

selecting one of said raw materials from said filtered list; and displaying in said browser said raw material information corresponding with said selected raw material.

5. A method according to claim 4 wherein:

said product comprises a pressure sensitive material; and said raw material information comprises master width, areas of concern regarding use of said selected raw material, description of facestock, description of adhesive, description of liner, and description of typical applications for which said selected raw material may be used.

6. A method according to claim 3 wherein:

said product comprises a pressure sensitive material; and said customer application criteria comprises print method, adhesive type, minimum temperature for adhesive type, service range of adhesive type, and facestock type.

7. An apparatus for selecting a raw material for manufacturing a product therefrom comprising:

means for storing in a computer system a list of different raw materials, with each of said raw materials having various customer application criteria stored therewith, and said criteria being indicative of intended application of said raw material in a product;

means for populating a plurality of filter lists corresponding with said stored customer application criteria for said different raw materials;

means for displaying a material browser including a plurality of filters corresponding with said filter lists;

means for selecting one of said filter lists and specifying a filter criterion therein;

means for filtering said list of raw materials to obtain a filtered list thereof matching said filter criterion;

means for sorting said filtered list by unit cost of said raw materials; and said displaying means being further configured for displaying in said browser said filtered list of raw materials matching said filter criterion.

8. An apparatus according to claim 7 wherein said displaying means are further configured for displaying also in said browser said various customer application criteria corresponding with each of said raw materials in said filtered list.

9. An apparatus according to claim 8 wherein:
said selecting means are further configured for selecting a plurality of said filter lists and selecting corresponding filter criterion therefor; and
said filtering means are further configured for filtering said list of raw materials to obtain said filtered list thereof matching said filter criteria corresponding with said selected filter lists.

10. An apparatus according to claim 9 wherein:
said storing means are configured for additionally storing with said list of raw materials raw material information corresponding with each of said raw materials including information different than said customer application criteria and information specific to permitted applications of said raw material in a product;
said selecting means are further configured for selecting one of said raw materials from said filtered list; and
said displaying means are further configured for displaying in said browser said raw material information corresponding with said selected raw material.

11. An apparatus according to claim 10 wherein:
said product comprises a pressure sensitive material; and
said raw material information comprises master width, areas of concern regarding use of said selected raw material, description of facestock, description of adhesive, description of liner, and description of typical applications for which said selected raw material may be used.

12. An apparatus according to claim 9 wherein:
said product comprises a pressure sensitive material; and
said customer application criteria comprises print method, adhesive type, minimum temperature for adhesive type, service range of adhesive type, and facestock type.

13. An apparatus according to claim 12 wherein said print method comprises cut sheet lap joined, cut sheet laser, direct thermal, thermal transfer, and impact.

14. An apparatus according to claim 12 wherein said adhesive type comprises permanent, cold temperature, and removable.

15. An apparatus according to claim 12 wherein said facestock type comprises paper, kimdura, 100# tag, 7 pt tag, 8 pt tag, matte litho, latex impregnated, gloss, matte chrome polyester, bright chrome polyester, clear polyester, white polyester, polyolefin, and vinyl.

16. A computer implemented method of selecting a raw material for manufacturing a pressure sensitive material product therefrom comprising:
storing in a computer system a list of different raw materials, with each of said raw materials having various customer application criteria stored therewith, and said criteria being indicative of intended application of said raw material in a product;
said customer application criteria comprises print method, adhesive type, minimum temperature for adhesive type, service range of adhesive type, and facestock type;
populating a plurality of filter lists corresponding with said stored customer application criteria for said different raw materials;
displaying a material browser including a plurality of filters corresponding with said filter lists;
selecting one of said filter lists and specifying a filter criterion therein;
filtering said list of raw materials to obtain a filtered list thereof matching said filter criterion;
sorting said filtered list by unit cost of said raw materials; and
displaying in said browser said filtered list of raw materials matching said filter criterion.

17. A method according to claim 16 further comprising displaying also in said browser said various customer application criteria corresponding with each of said raw materials in said filtered list.

18. A method according to claim 17 further comprising:
selecting a plurality of said filter lists and selecting corresponding filter criterion therefor; and
filtering said list of raw materials to obtain said filtered list thereof matching said filter criteria corresponding with said selected filter lists.

19. A method according to claim 18 further comprising:
additionally storing with said list of raw materials raw material information corresponding with each of said raw materials including information different than said customer application criteria and information specific to permitted applications of said raw material in a product;
selecting one of said raw materials from said filtered list; and
displaying in said browser said raw material information corresponding with said selected raw material.

20. A method according to claim 19 wherein said raw material information comprises master width, areas of concern regarding use of said selected raw material, description of facestock, description of adhesive, description of liner, and description of typical applications for which said selected raw material may be used.

21. A method according to claim 18 further comprising sorting said filtered list by unit cost of said raw materials.

22. A computer implemented method of selecting a raw material for manufacturing a pressure sensitive material product therefrom comprising:
storing in a computer system a list of different raw materials, with each of said raw materials having various customer application criteria stored therewith, and said criteria being indicative of intended application of said raw material in a product;
additionally storing with said list of raw materials raw material information corresponding with each of said raw materials including information different than said customer application criteria and information specific to permitted applications of said raw material in a product;
said raw material information comprises master width, areas of concern regarding use of said selected raw material, description of facestock, description of adhesive, description of liner, and description of typical applications for which said selected raw material may be used;
populating a plurality of filter lists corresponding with said stored customer application criteria for said different raw materials;
displaying a material browser including a plurality of filters corresponding with said filter lists;
selecting one of said filter lists and specifying a filter criterion therein;
filtering said list of raw materials to obtain a filtered list thereof matching said filter criterion;
sorting said filtered list by unit cost of said raw materials;
displaying in said browser said filtered list of raw materials matching said filter criterion;
selecting one of said raw materials from said filtered list; and
displaying in said browser said raw material information corresponding with said selected raw material.

23. A method according to claim 22 further comprising displaying also in said browser said various customer application criteria corresponding with each of said raw materials in said filtered list.

24. A method according to claim 23 further comprising:
selecting a plurality of said filter lists and selecting corresponding filter criterion therefor; and
filtering said list of raw materials to obtain said filtered list thereof matching said filter criteria corresponding with said selected filter lists.

25. A method according to claim 24 wherein said customer application criteria comprises print method, adhesive type, minimum temperature for adhesive type, service range of adhesive type, and facestock type.

\* \* \* \* \*